US011873775B2

(12) United States Patent
Itaba et al.

(10) Patent No.: US 11,873,775 B2
(45) Date of Patent: Jan. 16, 2024

(54) FUEL INJECTION CONTROL DEVICE

(71) Applicant: HITACHI ASTEMO, LTD., Hitachinaka (JP)

(72) Inventors: Fumihiro Itaba, Hitachinaka (JP);
Osamu Mukaihara, Hitachinaka (JP);
Takao Miyake, Hitachinaka (JP);
Takuya Watai, Hitachinaka (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 0 days.

(21) Appl. No.: 17/777,986

(22) PCT Filed: Nov. 4, 2020

(86) PCT No.: PCT/JP2020/041142
§ 371 (c)(1),
(2) Date: May 18, 2022

(87) PCT Pub. No.: WO2021/100458
PCT Pub. Date: May 27, 2021

(65) Prior Publication Data
US 2022/0412282 A1    Dec. 29, 2022

(30) Foreign Application Priority Data

Nov. 21, 2019 (JP) .................................. 2019-210805

(51) Int. Cl.
*F02D 41/20* (2006.01)
*F02D 41/38* (2006.01)

(52) U.S. Cl.
CPC ............. *F02D 41/20* (2013.01); *F02D 41/38* (2013.01); *F02D 2041/2027* (2013.01);
(Continued)

(58) Field of Classification Search
CPC ...... F02D 41/20; F02D 41/24; F02D 41/2467; F02D 41/32; F02D 41/38; F02D 41/3809;
(Continued)

(56) References Cited

U.S. PATENT DOCUMENTS

2016/0076498 A1    3/2016  Aono et al.
2016/0138511 A1*   5/2016  Toyohara ............ F02D 41/3809
                                                     123/478
(Continued)

FOREIGN PATENT DOCUMENTS

JP     2014-214837 A    11/2014
JP     2015-096720 A     5/2015
(Continued)

OTHER PUBLICATIONS

International Search Report with English Translation and Written Opinion for related Application No. PCT/JP2020/041142 dated Feb. 9, 2021.

*Primary Examiner* — John Kwon
*Assistant Examiner* — Johnny H Hoang
(74) *Attorney, Agent, or Firm* — Foley & Lardner LLP

(57) ABSTRACT

An injection amount variation of a plurality of fuel injection valves is reduced regardless of a state of an engine. According to one aspect of the present invention, there is provided a fuel injection control device 127 that controls a plurality of fuel injection valves having a coil for energization, including a valve body operation time detection unit 211 that detects a valve closing completion time from an end of energization of the fuel injection valve to completion of valve closing of a valve body of the fuel injection valve, a drive current correction unit 213 that corrects a drive current parameter of the fuel injection valve based on the valve closing completion time, an injection pulse width correction unit 214 that corrects an energization time of the fuel injection valve based on the valve closing completion time, and a correction (Continued)

method selection unit 212 that selects at least one of the drive current correction unit 213 and the injection pulse width correction unit 214 to execute correction based on a state of an engine.

20 Claims, 9 Drawing Sheets

(52) U.S. Cl.
CPC ............... *F02D 2041/2055* (2013.01); *F02D 2200/0602* (2013.01); *F02D 2200/101* (2013.01)

(58) Field of Classification Search
CPC .................. F02D 41/40; F02D 41/401; F02D 2200/0602; F02D 2200/0614; F02D 2200/101; F02D 2041/2027; F02D 2041/2034; F02D 2041/2055; F02D 2250/40; F02D 45/00; F02M 51/00
See application file for complete search history.

(56) References Cited

U.S. PATENT DOCUMENTS

| | | |
|---|---|---|
| 2016/0245211 A1 | 8/2016 | Katsurahara et al. |
| 2017/0051696 A1 | 2/2017 | Mukaihara et al. |
| 2017/0218876 A1* | 8/2017 | Kusakabe ............... F02D 41/34 |
| 2017/0335787 A1 | 11/2017 | Aono et al. |
| 2018/0209365 A1 | 7/2018 | Aono et al. |
| 2019/0024602 A1 | 1/2019 | Hauser et al. |
| 2019/0218990 A1 | 7/2019 | Aono et al. |
| 2020/0088122 A1 | 3/2020 | Kusakabe et al. |
| 2021/0164414 A1* | 6/2021 | Oki ........................ F02D 41/20 |

FOREIGN PATENT DOCUMENTS

| | | |
|---|---|---|
| JP | 2016-121610 A | 7/2016 |
| JP | 2018-084240 A | 5/2018 |
| JP | 2018-109411 A | 7/2018 |
| JP | 2018-115628 A | 7/2018 |
| WO | WO2017/022479 A1 | 2/2017 |

* cited by examiner

FUEL INJECTION CONTROL DEVICE

TECHNICAL FIELD

The present invention relates to a fuel injection control device.

BACKGROUND ART

In recent years, it is required to simultaneously achieve low fuel consumption and high output of an internal combustion engine. As one of means for achieving this, expansion of a dynamic range of a fuel injection valve is required. In order to expand the dynamic range of the fuel injection valve, it is necessary to improve dynamic flow characteristics while securing static flow characteristics in the related art. As a method for improving the dynamic flow characteristics, reduction of a minimum injection amount by half lift control is known.

For example, PTL 1 discloses, as a control device that controls an operation of a fuel injection valve, a control device that detects individual difference information of the fuel injection valve and varies a drive current for each fuel injection valve when energization control of the fuel injection valve is performed based on the detected individual difference information.

In the control device described in PTL 1, it is determined whether a peak current of the drive current common to all of the fuel injection valves installed in an internal combustion engine for opening the fuel injection valve is excessively supplied or insufficient based on the detected individual difference information, and a valve opening force at the time of valve opening is optimized by reducing or increasing the drive current. In addition, by applying a reverse voltage immediately after the peak current is energized and rapidly drawing out the current energized in the fuel injection valve, an acceleration of a valve body immediately before completion of valve opening is reduced, and valve body bouncing after completion of valve opening is reduced.

CITATION LIST

Patent Literature

PTL 1: JP 2018-109411 A

SUMMARY OF INVENTION

Technical Problem

In the control device of the fuel injection valve disclosed in PTL 1, a valve body behavior of each fuel injection valve is matched in a half lift region before the valve body of the fuel injection valve reaches a full lift, and an injection amount variation can be reduced. However, in the injection amount after the full lift, the injection amount variation due to a variation in a valve closing behavior after the energization is turned off is not taken into consideration. In addition, since a minimum guaranteed current value that enables valve opening increases as a pressure (fuel pressure) of a supplied fuel increases, at the time of a high fuel pressure, it may be difficult to execute energization correction so that a peak current value becomes small, and the injection amount variation becomes large.

In view of the above circumstances, there has been a demand for a method for reducing the injection amount variation of a plurality of fuel injection valves regardless of a state of an engine.

Solution to Problem

In order to solve the above problem, according to one aspect of the present invention, there is provided a fuel injection control device that controls a plurality of fuel injection valves having a coil for energization, including a valve body operation time detection unit that detects a valve closing completion time from an end of energization of the fuel injection valve to completion of valve closing of the valve body of the fuel injection valve, a drive current correction unit that corrects a drive current parameter of the fuel injection valve based on the valve closing completion time, an injection pulse width correction unit that corrects an energization time of the fuel injection valve based on the valve closing completion time, and a correction method selection unit that selects at least one of the drive current correction unit and the injection pulse width correction unit to execute correction based on a state of an engine.

Advantageous Effects of Invention

According to at least one aspect of the present invention, an injection amount variation can be reduced by appropriately selecting a driving method of a plurality of fuel injection valves according to a state of an engine.

Problems, configurations, and effects other than those described above will be clarified by the following description of embodiments.

DESCRIPTION OF EMBODIMENTS

Figure 1:
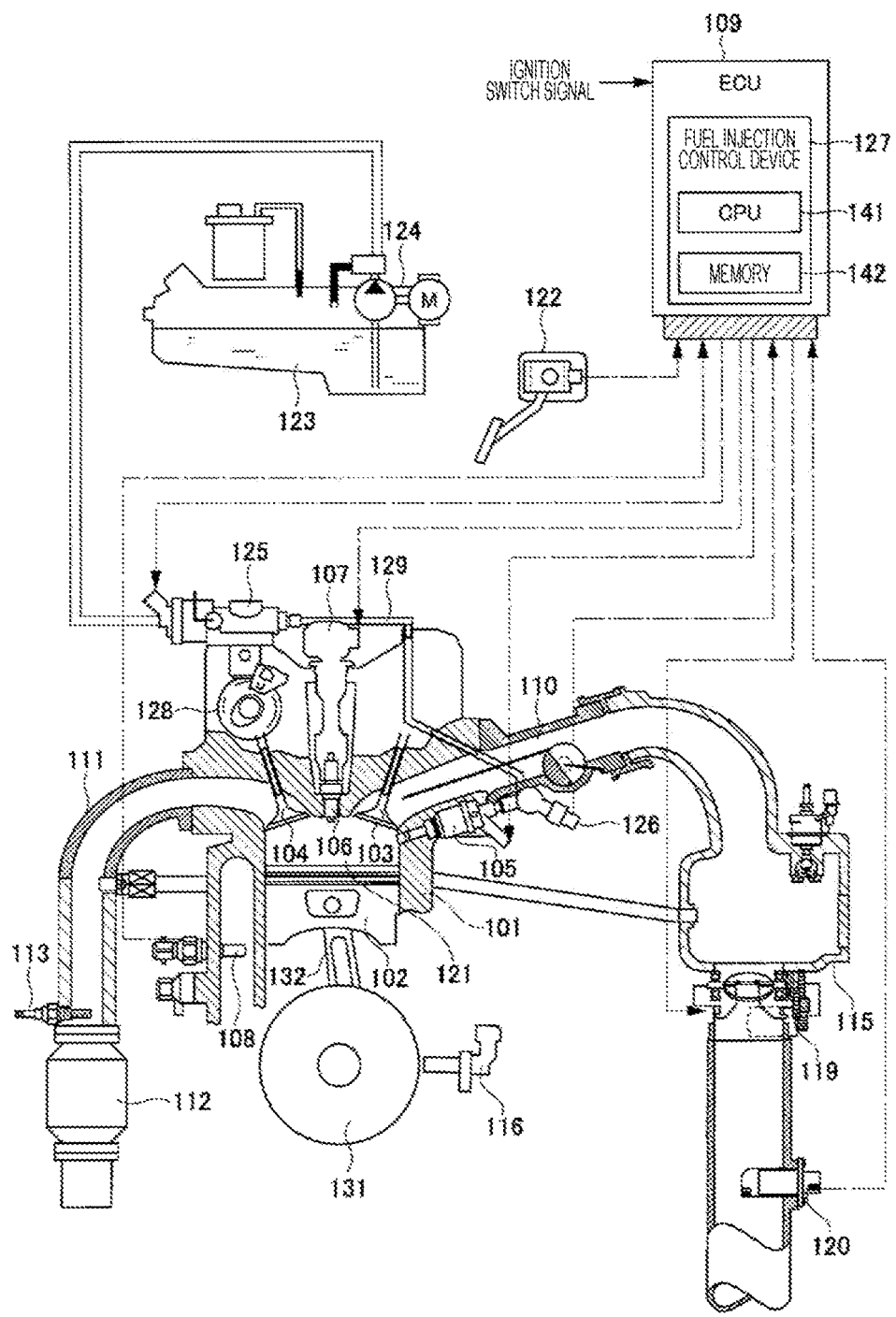
FIG. 1 is a schematic overall configuration diagram illustrating a basic configuration example of an internal combustion engine system equipped with a fuel injection control device according to an embodiment of the present invention.

Hereinafter, examples of modes for carrying out the present invention will be described with reference to the accompanying drawings. In the present specification and the accompanying drawings, components having substantially the same function or configuration are denoted by the same reference numerals, and redundant description is omitted.

One Embodiment

[Internal Combustion Engine System]

First, a configuration of an internal combustion engine system equipped with a fuel injection control device according to the present embodiment will be described. FIG. 1 is an overall configuration diagram of an internal combustion engine system equipped with a fuel injection control device according to an embodiment.

An internal combustion engine (engine) 101 illustrated in FIG. 1 is a four-cycle engine that repeats four strokes of a suction stroke, a compression stroke, a combustion (expansion) stroke, and an exhaust stroke, and is, for example, a multi-cylinder engine including four cylinders (cylinders). Note that the number of cylinders included in the internal combustion engine 101 is not limited to four, and may include six or eight or more cylinders.

The internal combustion engine 101 includes a piston 102, an intake valve 103, and an exhaust valve 104. An intake air (intake air) to the internal combustion engine 101 passes through an air flow meter (AFM) 120 that detects an amount of air flowing in, and a flow rate thereof is adjusted by a throttle valve 119. The air that has passed through the throttle valve 119 is sucked into a collector 115 that is a branch portion, and then supplied to a combustion chamber 121 of each cylinder via an intake pipe 110 and the intake valve 103 provided for each cylinder (cylinder).

On the other hand, the fuel is supplied from a fuel tank 123 to a high-pressure fuel pump 125 by a low-pressure fuel pump 124, and a pressure thereof is increased to a pressure necessary for fuel injection by the high-pressure fuel pump 125. That is, the high-pressure fuel pump 125 moves a plunger provided in the high-pressure fuel pump 125 up and down by power transmitted from an exhaust camshaft (not illustrated) of an exhaust cam 128, and pressurizes (boosts) the fuel in the high-pressure fuel pump 125.

An on-off valve driven by a solenoid is provided in a suction port of the high-pressure fuel pump 125, and the solenoid is connected to a fuel injection control device 127 provided in an Engine Control Unit (ECU) 109 which is an electronic control device. The fuel injection control device 127 controls the solenoid based on a control command from the ECU 109, and drives the on-off valve so that a pressure (hereinafter, it is abbreviated as "fuel pressure") of the fuel discharged from the high-pressure fuel pump 125 becomes a desired pressure. The ECU 109 (fuel injection control device 127) includes, for example, a CPU 141, a memory 142, and an input/output interface (not illustrated).

The CPU 141 is a processor that performs arithmetic processing. The memory 142 is a storage unit including a volatile or nonvolatile semiconductor memory or the like. The memory 142 may store a computer program for controlling a fuel injection valve 105. In this case, the CPU 141 reads and executes the computer program recorded in the memory 142, thereby realizing all or a part of functions of the fuel injection control device 127. An ignition switch signal for commanding start (ignition) of the internal combustion engine 101 is input to the ECU 109. For example, when detecting that the ignition switch signal is on, the CPU 141 starts processing of the computer program of the fuel injection control. Note that instead of the CPU 141, another arithmetic processing device such as a Micro Processing Unit (MPU) may be used.

The fuel boosted by the high-pressure fuel pump 125 is transmitted to the fuel injection valve 105 via the high-pressure fuel pipe 129. The fuel injection valve 105 directly injects fuel into the combustion chamber 121 based on a command from the fuel injection control device 127. The fuel injection valve 105 is an electromagnetic valve that injects fuel by operating a valve body when a drive current is supplied (energized) to an electromagnetic coil described later.

Further, the internal combustion engine 101 is provided with a fuel pressure sensor (fuel pressure sensor) 126 that measures a fuel pressure in the high-pressure fuel pipe 129. The ECU 109 transmits a control command for setting a fuel pressure in the high-pressure fuel pipe 129 to a desired pressure to the fuel injection control device 127 based on the measurement result by the fuel pressure sensor 126. That is, the ECU 109 performs so-called feedback control to set the fuel pressure in the high-pressure fuel pipe 129 to a desired pressure.

Furthermore, each combustion chamber 121 of the internal combustion engine 101 is provided with an ignition plug 106, an ignition coil 107, and a water temperature sensor 108. The ignition plug 106 exposes an electrode portion in the combustion chamber 121, and ignites an air-fuel mixture in which the intake air and the fuel are mixed in the combustion chamber 121 by discharge. The ignition coil 107 creates a high voltage for discharging the air-fuel mixture by the ignition plug 106. The water temperature sensor 108 measures a temperature of a cooling water for cooling the cylinder of the internal combustion engine 101.

The ECU 109 performs energization control of the ignition coil 107 and ignition control by the ignition plug 106. The air-fuel mixture in which the intake air and the fuel are mixed in the combustion chamber 121 is combusted by a spark emitted from the ignition plug 106, and the piston 102 is pushed down by this pressure.

An exhaust gas generated by the combustion is discharged to an exhaust pipe 111 via the exhaust valve 104. The exhaust pipe 111 is provided with a three-way catalyst 112 and an oxygen sensor 113. The three-way catalyst 112 purifies harmful substances such as nitrogen oxides (NOx) contained in the exhaust gas, for example. The oxygen sensor 113 detects an oxygen concentration contained in the exhaust gas and outputs the detection result to the ECU 109. The ECU 109 performs feedback control based on the detection result of the oxygen sensor 113 so that the fuel injection amount supplied from the fuel injection valve 105 becomes a target air-fuel ratio.

A crankshaft 131 is connected to the piston 102 via a connecting rod 132. A reciprocating motion of the piston 102 is converted into a rotational motion by the crankshaft 131. A crank angle sensor 116 is attached to the crankshaft 131.

The crank angle sensor 116 detects a rotation and a phase of the crankshaft 131 and outputs the detection result to the ECU 109. The ECU 109 can detect a rotation speed of the internal combustion engine 101 based on the output of the crank angle sensor 116.

Signals from the crank angle sensor 116, the air flow meter 120, the oxygen sensor 113, an accelerator opening sensor 122 indicating an opening degree of an accelerator operated by an operator, the fuel pressure sensor 126, and the like are input to the ECU 109.

The ECU 109 calculates a required torque of the internal combustion engine 101 based on the signal supplied from the accelerator opening sensor 122, and determines whether or not the engine is in an idle state. Further, the ECU 109 calculates an intake air amount necessary for the internal combustion engine 101 from the required torque and the like, and outputs an opening degree signal corresponding thereto to the throttle valve 119.

In addition, the ECU 109 includes a rotation speed detection unit that calculates a rotation speed (hereinafter, referred to as an engine speed) of the internal combustion engine 101 based on the signal supplied from the crank angle sensor 116. Furthermore, the ECU 109 includes a warm-up determination unit that determines whether the three-way catalyst 112 is in a warm-up state from the temperature of the cooling water obtained from the water temperature sensor 108, the elapsed time after the start of the internal combustion engine 101, and the like.

The fuel injection control device 127 calculates a fuel amount corresponding to the intake air amount, and outputs a fuel injection signal corresponding thereto to the fuel injection valve 105. Further, the fuel injection control device 127 outputs an energization signal to the ignition coil 107 and outputs an ignition signal to the ignition plug 106.

[Configuration of Fuel Injection Control Device]

Next, a configuration of the fuel injection control device 127 illustrated in FIG. 1 will be described with reference to FIGS. 2 and 3.

Figure 2:
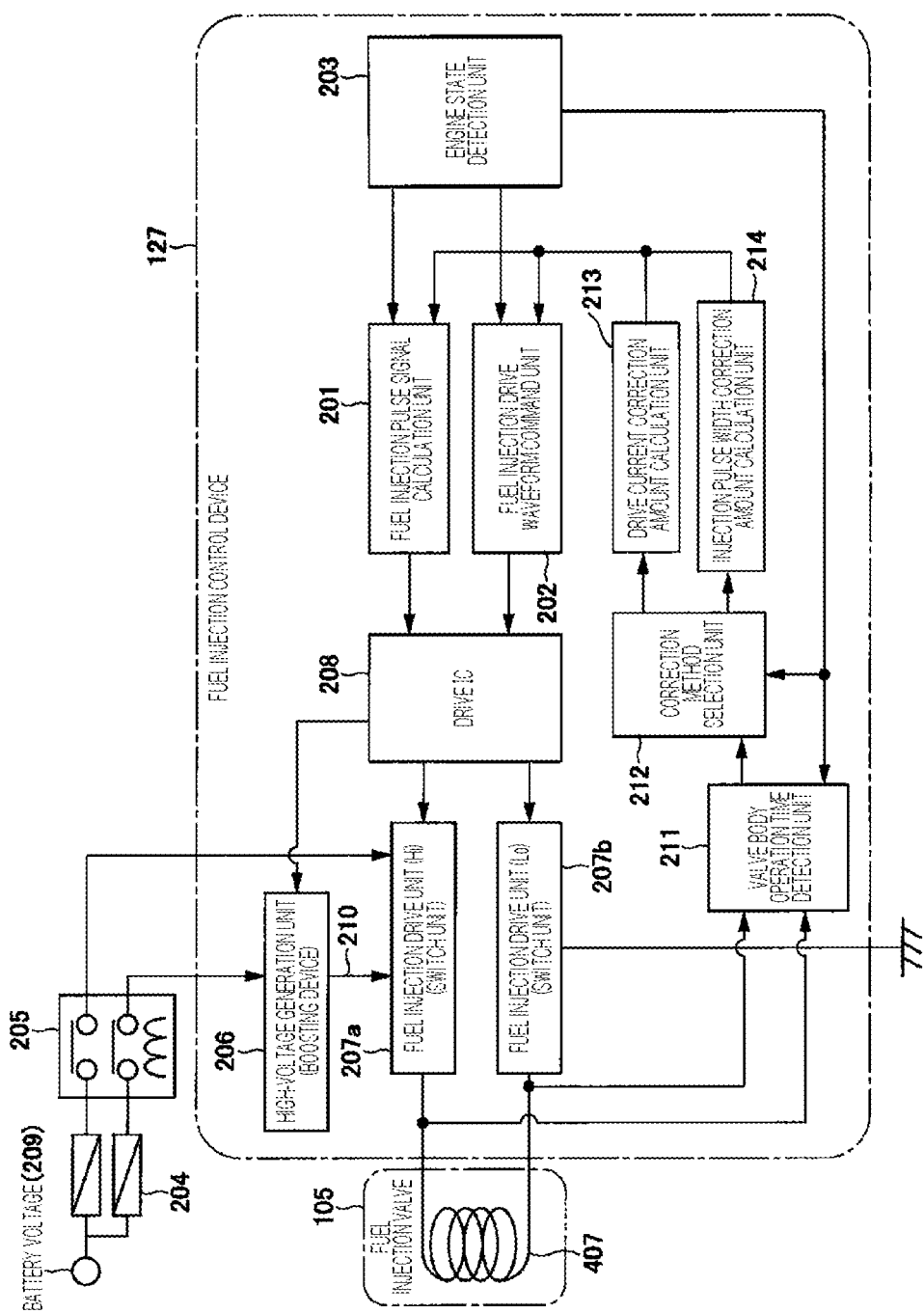
FIG. 2 is a schematic configuration diagram illustrating a fuel injection control device according to an embodiment of the present invention.

FIG. 2 is a schematic configuration diagram illustrating the fuel injection control device 127. FIG. 3 is a diagram illustrating a configuration example of the fuel injection drive unit illustrated in FIG. 2.

As illustrated in FIG. 2, the fuel injection control device 127 includes a fuel injection pulse signal calculation unit 201 and a fuel injection drive waveform command unit 202 as fuel injection control units, an engine state detection unit 203, and a drive IC 208. In addition, the fuel injection control device 127 includes a high voltage generation unit (boosting device) 206, fuel injection drive units 207a and 207b, a valve body operation time detection unit 211, a correction method selection unit 212, a drive current correction amount calculation unit 213, and an injection pulse width correction amount calculation unit 214.

The engine state detection unit 203 collects and provides various types of information such as the engine speed, the intake air amount, the temperature of the cooling water, the fuel pressure, and a failure state of the internal combustion engine 101 described above.

The fuel injection pulse signal calculation unit 201 calculates an injection pulse width that defines a fuel injection period of the fuel injection valve 105 for realizing fuel injection with the required injection amount based on various types of information including the required injection amount obtained from the engine state detection unit 203. Since the injection pulse width is determined from a characteristic of a reference fuel injection valve (for example, a design variation central product), an injection pulse width correction amount for each cylinder calculated by the injection pulse width correction amount calculation unit 214 to be described later is added and output to the drive IC 208.

The fuel injection drive waveform command unit 202 calculates a command value of a drive current to be supplied for opening and maintaining the opening of the fuel injection valve 105 based on various types of information including the fuel pressure obtained from the engine state detection unit 203. Although the command value of the drive current is a current value common to all of the cylinders, a drive current correction amount for each cylinder calculated by a drive current correction amount calculation unit 213 to be described later is added and output to the drive IC 208.

A battery voltage 209 is supplied to a high voltage generation unit 206 via a fuse 204 and a relay 205. The high voltage generation unit 206 generates a high power supply voltage 210 (VH) required when the electromagnetic solenoid type fuel injection valve 105 is opened based on the battery voltage 209. Hereinafter, the power supply voltage 210 is referred to as a high voltage 210. As a power source of the fuel injection valve 105, two systems of the high voltage 210 for securing a valve opening force of the valve body and the battery voltage 209 for holding a valve opening so as not to close the valve body after the valve is opened are provided.

The fuel injection drive unit 207a (switch unit) is provided on an upstream side (power supply side) of the fuel injection valve 105, and supplies the high voltage 210 necessary for opening the fuel injection valve 105 to the fuel injection valve 105. After opening the fuel injection valve 105, the fuel injection drive unit 207a supplies the battery voltage 209 necessary for holding an open state of the fuel injection valve 105 to the fuel injection valve 105.

Figure 3:
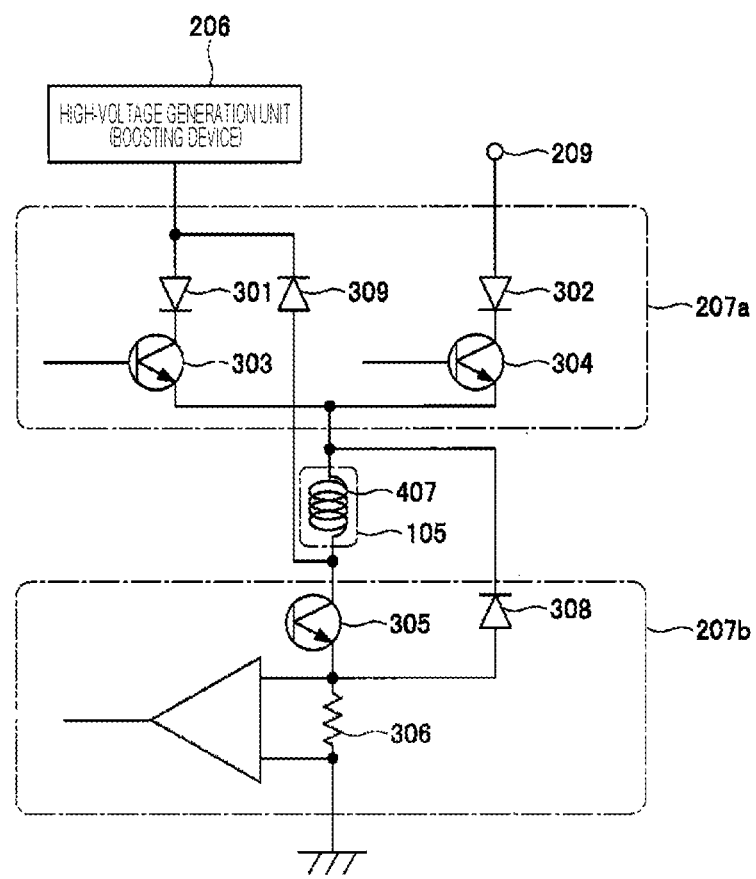
FIG. 3 is a diagram illustrating a configuration example of a fuel injection drive unit illustrated in FIG. 2.

As illustrated in FIG. 3, the fuel injection drive unit 207a includes diodes 301 and 302, a high-voltage side switching element 303, and a low-voltage side switching element 304. The fuel injection drive unit 207a supplies the high voltage 210 supplied from the high voltage generation unit 206 to the fuel injection valve 105 by using the high-voltage side switching element 303 through the diode 301 provided to prevent current backflow.

In addition, the fuel injection drive unit 207a supplies the battery voltage 209 supplied via the relay 205 to the fuel injection valve 105 by using the low-voltage side switching element 304 through the diode 302 provided to prevent current backflow.

The fuel injection drive unit 207b (switch unit) is provided on a downstream side (ground side) of the fuel injection valve 105, and includes a switching element 305 and a shunt resistor 306. The fuel injection drive unit 207b applies the power supplied from the fuel injection drive unit 207a on the upstream side to the fuel injection valve 105 by turning on the switching element 305. In addition, the fuel injection drive unit 207b detects a current consumed in the fuel injection valve 105 by the shunt resistor 306.

The drive IC 208 illustrated in FIG. 2 controls the fuel injection drive units 207a and 207b based on the injection pulse width calculated by the fuel injection pulse signal calculation unit 201 and a drive current waveform (drive current profile) calculated by the fuel injection drive waveform command unit 202. That is, the drive IC 208 controls the high voltage 210 and the battery voltage 209 applied to the fuel injection valve 105, and controls a drive current supplied to the fuel injection valve 105.

Further, the diode 309 is connected between a downstream side of a solenoid 407 (see FIG. 4) and the high voltage generation unit 206 in a forward direction, and a diode 308 is connected between the shunt resistor 306 and an upstream side of the solenoid 407 in the forward direction. When the high-voltage side switching element 303, the low-voltage side switching element 304, and the switching element 305 are turned off, the diode 308 and the diode 309 are energized by a counter electromotive force generated in the solenoid 407 of the fuel injection valve 105. As a result, the current is fed back to the high voltage generation unit 206 side, and the drive current that has been supplied to the solenoid 407 rapidly decreases. At this time, a voltage (−VH) having a magnitude corresponding to, for example, the high voltage 210 and a reverse polarity is generated as the counter electromotive force between terminals of the solenoid 407.

The valve body operation time detection unit 211 detects a valve body operation time in the fuel injection valve 105 and outputs the valve body operation time to the correction method selection unit 212.

The correction method selection unit 212 selects at least one of the drive current correction amount calculation unit 213 and the injection pulse width correction amount calculation unit 214 based on a state of the engine (system including the internal combustion engine 101), and transmits information on the valve body operation time detected by the valve body operation time detection unit 211 to the selected correction amount calculation unit to execute correction control. The selection processing by the correction method selection unit 212 will be described later in detail.

The drive current correction amount calculation unit 213 (an example of the drive current correction unit) calculates a correction amount of the drive current based on the valve body operation time, and outputs the calculated correction amount to the fuel injection drive waveform command unit 202.

The injection pulse width correction amount calculation unit 214 (an example of the injection pulse width correction unit) calculates a correction amount of an ON time (injection pulse width) of an injection pulse signal based on the valve body operation time, and outputs the calculated correction amount to the fuel injection pulse signal calculation unit 201. The correction method selection unit 212, the drive current correction amount calculation unit 213, and the injection pulse width correction amount calculation unit 214 function as a correction control unit that executes drive correction control.

[Configuration of Fuel Injection Valve]

Next, the configuration of the fuel injection valve 105 will be described with reference to FIG. 4.

Figure 4:
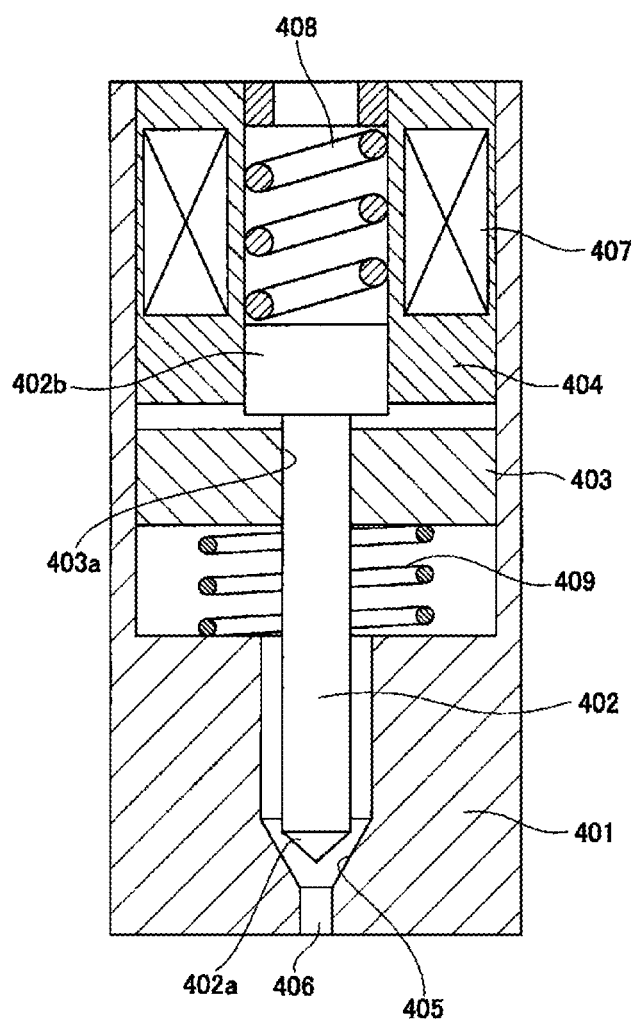
FIG. 4 is a cross-sectional view of a fuel injection valve illustrated in FIG. 1.

FIG. 4 is a cross-sectional view of the fuel injection valve 105.

The fuel injection valve 105 is an electromagnetic fuel injection valve including a normally closed electromagnetic valve. The fuel injection valve 105 includes a housing 401 forming an outer shell, a valve body 402 disposed in the housing 401, a movable core 403, and a fixed core 404. In the housing 401, a valve seat 405 and an injection hole 406 communicating with the valve seat 405 are formed.

The valve body 402 is formed in a substantially rod shape, and a distal end portion 402a as one end is formed in a substantially conical shape. The distal end portion 402a of the valve body 402 faces the valve seat 405 of the housing 401. The fuel injection valve 105 is closed when the distal end portion 402a of the valve body 402 comes into contact with the valve seat 405, and fuel is not injected from the injection hole 406. Hereinafter, a direction in which the distal end portion 402a of the valve body 402 approaches the valve seat 405 is defined as a valve closing direction, and a direction in which the distal end portion 402a of the valve body 402 separates from the valve seat 405 is defined as a valve opening direction.

The fixed core 404 is formed in a tubular shape and is fixed to an end portion of the housing 401 on a side opposite to the valve seat 405. The other end (rear end) side of the valve body 402 is inserted into a cylindrical hole of the fixed core 404. Inside the fixed core 404, a solenoid 407 is disposed so as to make one round on the other end (rear end) side of the valve body 402.

A set spring 408 that biases the valve body 402 in the valve closing direction is disposed in the cylindrical hole of the fixed core 404. One end of the set spring 408 abuts on a rear end portion 402b which is the other end of the valve body 402, and the other end of the set spring 408 abuts on the housing 401.

The movable core 403 is disposed between the fixed core 404 and the valve seat 405, and has a circular through-hole 403a through which the valve body 402 penetrates. The rear end portion 402b of the valve body 402 is larger in diameter than the through-hole 403a of the movable core 403. Therefore, a periphery of the through-hole 403a in the movable core 403 faces a periphery of the rear end portion 402b of the valve body 402.

A zero spring 409 is disposed between the movable core 403 and the housing 401. The zero spring 409 biases the movable core 403 in the valve opening direction. The movable core 403 is disposed at an initial position set between the fixed core 404 and the valve seat 405 by being biased by the zero spring 409.

An inside of the housing 401 is filled with fuel. When no current flows through the solenoid 407, the set spring 408 biases the valve body 402 in the valve closing direction, and presses the valve body 402 against a spring load (spring force) of the zero spring 409 in the valve closing direction. As a result, the distal end portion 402a of the valve body 402 abuts on the valve seat 405 to close the injection hole 406.

When a current flows through the solenoid 407, a magnetic flux is generated between the fixed core 404 and the movable core 403, and a magnetic attraction force acts on the movable core 403. As a result, the movable core 403 is attracted to the fixed core 404 (solenoid 407), and the movable core 403 abuts on the rear end portion 402b of the valve body 402. As a result, the valve body 402 moves in the valve opening direction in conjunction with the movable core 403.

When the valve body 402 moves in the valve opening direction, the distal end portion 402a of the valve body 402 is separated from the valve seat 405, the injection hole 406 closed by the valve body 402 is opened, and fuel is injected. After the fuel injection, the movable core 403 returns to the initial position by a balance between the set spring 408 and the zero spring 409.

[Driving Method of Fuel Injection Valve]

Next, a driving method of the fuel injection valve 105 will be described with reference to FIG. 5.

Figure 5:
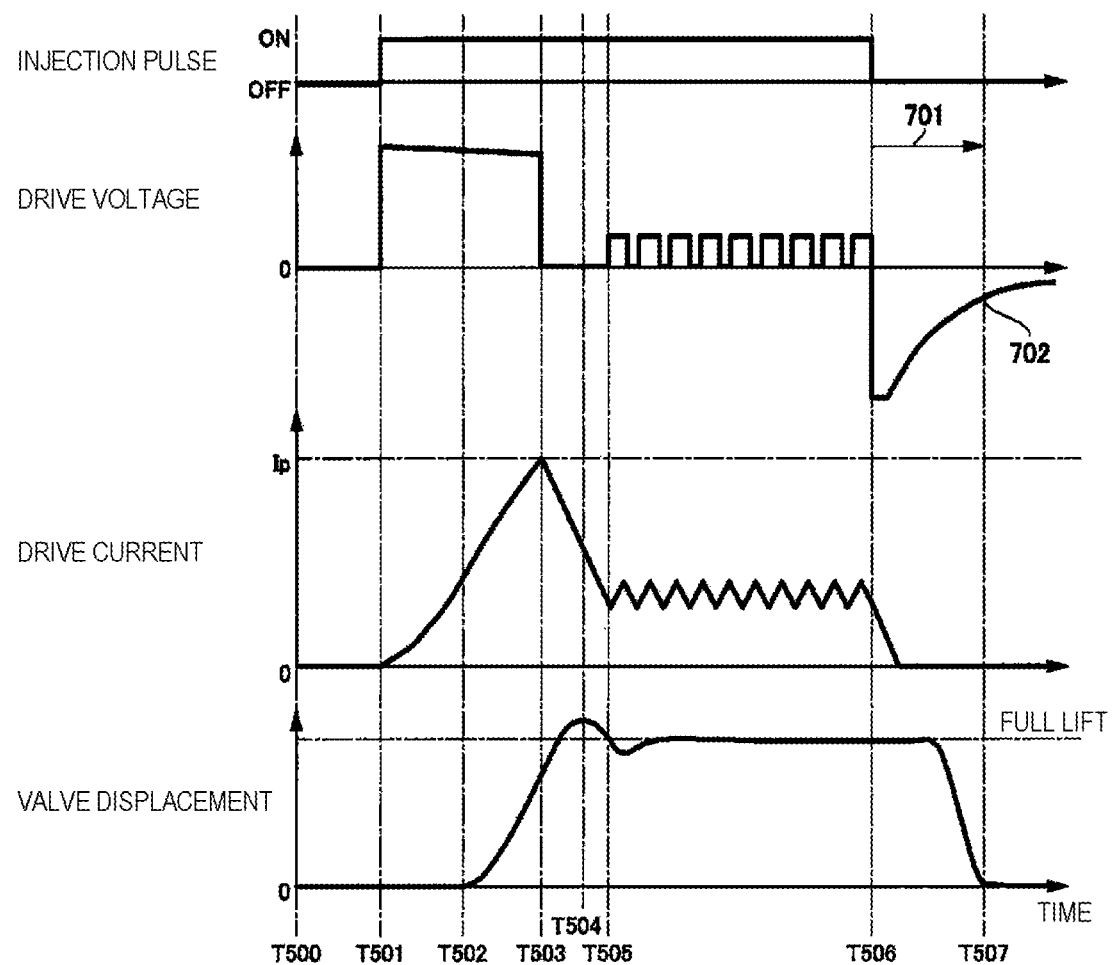
FIG. 5 is a timing chart for describing a driving method of a fuel injection valve illustrated in FIG. 1.

FIG. 5 is a timing chart for describing a driving method of the fuel injection valve 105. A horizontal axis represents a time, and a vertical axis represents an injection pulse, a drive voltage, a drive current, and a valve displacement. Note that the driving method of the fuel injection valve 105 illustrated in FIG. 5 is a driving method in a case where the drive current correction amount calculated by the drive current correction amount calculation unit 213 is not applied.

FIG. 5 illustrates an example of an injection pulse, a drive voltage, a drive current, and a displacement amount (valve displacement) of the valve body 402 in time series when fuel is injected from the fuel injection valve 105. When the fuel injection valve 105 is driven, a current setting value to be described later is set in advance based on a characteristic of the fuel injection valve 105. An injection amount characteristic of the fuel injection valve 105 based on the current setting value is stored in the memory 142 (for example, a Read Only Memory (RAM)) provided in the ECU 109. The fuel injection control device 127 calculates an injection pulse of the fuel injection valve 105 from an operation state of the internal combustion engine 101 and the injection amount characteristic of the fuel injection valve 105.

At times T500 and T501 illustrated in FIG. 5, the injection pulse output from the fuel injection pulse signal calculation unit 201 (see FIG. 2) is in an off state. Therefore, the fuel injection drive units 207a and 207b are turned off, and the drive current does not flow through the fuel injection valve 105. Therefore, the valve body 402 is biased in the valve closing direction by the spring load of the set spring 408 of the fuel injection valve 105, the distal end portion 402a of the valve body 402 abuts on the valve seat 405 to close the injection hole 406, and fuel is not injected.

Next, at the time T501, the injection pulse is turned on, and the fuel injection drive unit 207a and the fuel injection drive unit 207b are turned on. As a result, the high voltage 210 is applied to the solenoid 407, and a drive current flows through the solenoid 407. When the drive current flows through the solenoid 407, a magnetic flux is generated between the fixed core 404 and the movable core 403, and a magnetic attraction force acts on the movable core 403.

When the magnetic attraction force acts on the movable core 403, the movable core 403 starts to move in the valve opening direction (times T501 and T502). Thereafter, when the movable core 403 moves by a predetermined distance, the movable core 403 and the valve body 402 start to move integrally (time T502), and the fuel injection valve 105 is opened as the valve body 402 moves away from the valve seat 405. As a result, the fuel in the housing 401 is injected from the injection hole 406.

The valve body 402 moves integrally with the movable core 403 until the movable core 403 collides with the fixed core 404. Then, when the movable core 403 collides with the fixed core 404, the movable core 403 is bounced back by the fixed core 404, and the valve body 402 further continues to move in the valve opening direction. Thereafter, when the biasing force by the spring load of the set spring 408 and the pressure of the fuel (fuel pressure) exceeds the magnetic attraction force, the valve body 402 starts to move in the valve closing direction (hereinafter, referred to as a bouncing operation). The bouncing operation of the valve body 402 disturbs the flow rate of the fuel injected from the injection hole 406.

Therefore, before the movable core 403 collides with the fixed core 404 (time T503), that is, when the drive current reaches a peak current Ip, the switching elements 303 and 304 of the fuel injection drive units 207a and 207b are turned off to reduce the drive current flowing through the solenoid 407.

Then, from a time T504 to a time T505 when the injection pulse falls, the fuel injection drive unit 207b is maintained in the on state, and the fuel injection drive unit 207a is intermittently turned on. That is, by performing Pulse Width Modulation (PWM) control on the fuel injection drive unit 207a and intermittently setting the drive voltage applied to the solenoid 407 to the battery voltage 209, the drive current flowing through the solenoid 407 falls within a predetermined range. As a result, the magnetic attraction force of a magnitude necessary for attracting the movable core 403 to the fixed core 404 is generated.

At the time T505, the injection pulse is turned off. As a result, the fuel injection drive units 207a and 207b are all turned off, the drive voltage applied to the solenoid 407 decreases, and the drive current flowing through the solenoid 407 decreases. As a result, the magnetic flux generated between the fixed core 404 and the movable core 403 gradually disappears, and the magnetic attraction force acting on the movable core 403 disappears.

When the magnetic attraction force acting on the movable core 403 disappears, the valve body 402 is pushed back in the valve closing direction with a predetermined time delay by the spring load of the set spring 408 and a pressing force (biasing force) by the fuel pressure (fuel pressure). Then, at a time T506, the valve body 402 is returned to an original position. That is, the distal end portion 402a of the valve body 402 abuts on the valve seat 405, and the fuel injection valve 105 is closed. As a result, fuel is not injected from the injection hole 406.

From the time T505 when the injection pulse is turned off, a residual magnetic force in the fuel injection valve 105 is quickly removed, and the high voltage 210 is supplied in the direction opposite to the direction when the fuel injection valve 105 is driven so that the valve body 402 is closed early.

[Injection Amount Characteristic in Case of Using Drive Current]

Next, the injection amount characteristic when the drive current described in detail in FIG. 5 is used will be described with reference to FIG. 6.

Figure 6:
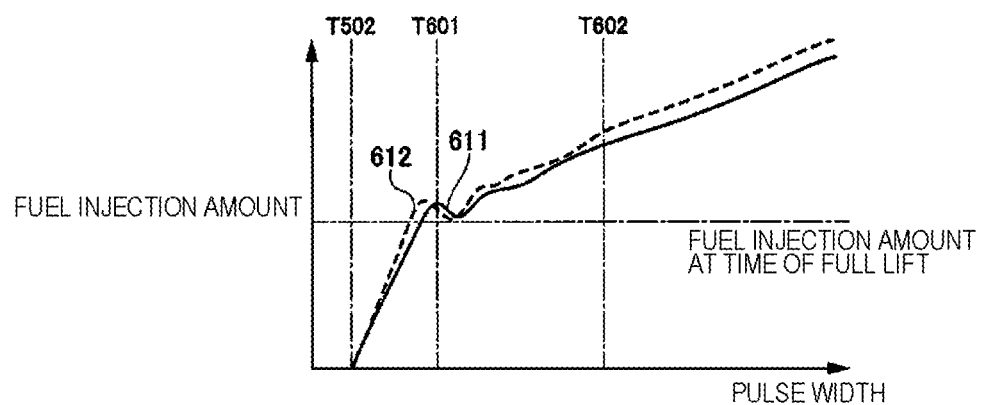
FIG. 6 is a diagram illustrating a relationship between an injection pulse width of a fuel injection valve illustrated in FIG. 1 and a fuel injection amount.

FIG. 6 is a diagram illustrating a relationship between the injection pulse width of the fuel injection valve 105 and the fuel injection amount, where a horizontal axis represents the injection pulse width and a vertical axis represents the fuel injection amount for each injection pulse width. In addition, an injection amount characteristic 611 indicated by a solid line is set as a reference product, and an injection amount characteristic 612 indicated by a dotted line represents the fuel injection valve 105 in which the spring load of the set spring 408 is smaller than that of the reference product.

As illustrated in FIG. 6, in a case of a fuel injection valve having the injection amount characteristic 611, a lift amount of the valve body 402 increases based on a supply time of a peak current by a high voltage application in a period from the time T502 when the valve body 402 starts to be opened to a time T601 when the valve body 402 reaches a full lift, so that the fuel injection amount increases. An inclination of the fuel injection amount in this period (fuel injection amount increase rate from the time T502 to the time T601) is determined according to a valve opening speed of the valve body 402. As described above, since the supply power of the peak current is the high voltage 210, the inclination of the fuel injection amount is steep.

Thereafter, the movable core 403 collides with the fixed core 404, and the valve body 402 starts the bouncing operation, so that the fuel injection amount is disturbed (from the time T601 to time T602). This bouncing operation occurs when the drive current is large with respect to the characteristic variation for each fuel injection valve, the spring load of the set spring 408, or the pressing force due to the pressure of the fuel. Since the valve body 402 after the time T602 when the bouncing operation converges maintains a full lift position, the fuel injection amount has an increasing characteristic of an inclination proportional to a length of the injection pulse.

In the injection amount characteristic 612, the fuel injection amount increase rate when the valve is opened is higher than that of the fuel injection valve of the injection amount characteristic 611, and the bouncing operation is large. In addition, the injection amount is larger than the injection amount characteristic 611 even after the time T602 when the bouncing operation converges. This is because, by driving each fuel injection valve with the same drive current, a fuel injection valve having a weak spring load of the set spring 408 has a high valve opening speed and a high injection amount increase rate at the time of valve opening, and a low valve closing speed after the energization is stopped. Therefore, the injection amount characteristic 612 has a characteristic of being offset to the side where the injection amount is larger than the injection amount characteristic 611.

For the above reason, when a plurality of fuel injection valves are driven with the common drive current and injection pulse width, the injection amount variation occurs in each fuel injection valve.

[Method for Detecting Valve Body Operation Time]

Next, a method of detecting the valve body operation time of the fuel injection valve 105 executed by the valve body operation time detection unit 211 will be described with reference to FIG. 7.

Figure 7:
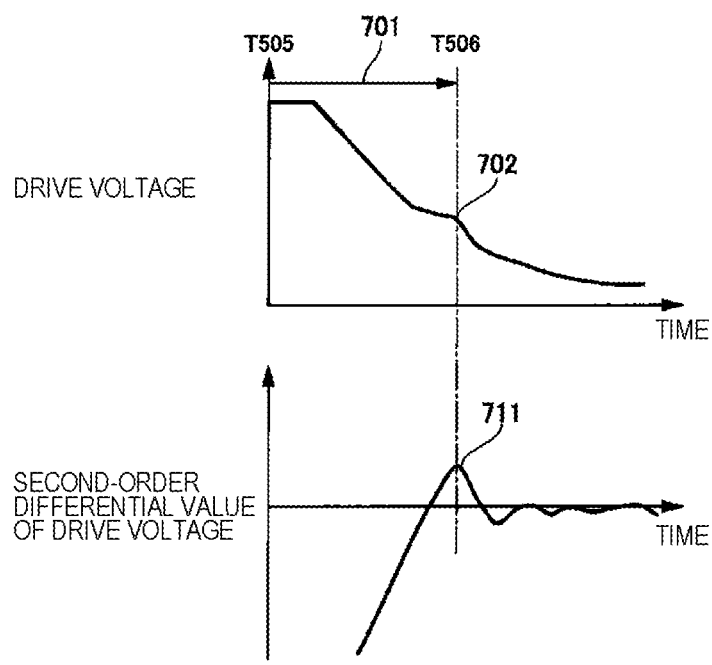
FIG. 7 is a diagram for describing detection of a valve closing completion time using a drive voltage in the fuel injection valve illustrated in FIG. 1.

FIG. 7 is a diagram for describing the detection of the valve closing time using the drive voltage in the fuel injection valve 105, where a horizontal axis represents the injection pulse width, and a vertical axis represents a second-order differential value of the fuel injection amount and the drive voltage. Note that a valve closing time 701 is defined as an elapsed time from the time point when the injection pulse is turned off (time T505) to the time when the valve closing is completed (time T506).

As described above, when the valve body 402 of the fuel injection valve 105 is opened, the high voltage 210 is applied to the solenoid 407, a relatively large drive current flows, and the movable core 403 and the valve body 402 are accelerated. Next, the high voltage 210 applied to the solenoid 407 is cut off, and the drive current flowing through the solenoid 407 decreases to a predetermined value (holding current).

When the fuel injection valve 105 is closed, when the valve body 402 collides with the valve seat 405, the zero spring 409 changes from extension to compression, a movement direction of the movable core 403 is reversed, the acceleration changes, and an inductance of the solenoid 407 changes. That is, when the fuel injection valve 105 is closed, the drive current flowing through the solenoid 407 is cut off, and a counter electromotive force is applied to the solenoid 407. When the drive current converges, the counter electromotive force also gradually decreases. Therefore, when the counter electromotive force decreases, the inductance of the solenoid 407 changes, so that an inflection point (inflection point 702) is generated in the drive voltage.

The inflection point 702 of the drive voltage appearing when the fuel injection valve 105 is closed is a valve closing timing of the fuel injection valve 105. Therefore, the valve closing time 701 can be detected by measuring the time from the timing (time T506) when the injection pulse is turned off to the inflection point 702 of the drive voltage.

The inflection point 702 appears as an extreme value 711 (maximum value or minimum value) when the time-series data of the drive voltage applied to the solenoid 407 is second-order differentiated. Therefore, the inflection point 702 can be specified by detecting the extreme value 711 of the time-series data of the drive voltage.

When an S/N ratio of the drive voltage is low and a noise level thereof is large, it is difficult to detect the extreme value from the result of the second-order differentiation of the time-series data of the drive voltage. Therefore, a desired extreme value can be detected by applying a low-pass filter or the like to the drive voltage and second-order differentiating the smoothed time-series data. The second-order differential value of the drive voltage illustrated on a lower side of FIG. 7 is obtained by filtering the time-series data of the drive voltage and performing second-order differentiation on the smoothed time-series data.

When the second-order differentiation is subjected to the time-series data of the drive voltage from the time point (time T505) when the injection pulse is turned off, there is a possibility that the time when the voltage is switched (the time when the counter electromotive force is applied after the drive voltage is turned off) appears as an extreme value. Then, the inflection point generated by the acceleration change of the movable core 403 cannot be accurately specified.

Therefore, it is desirable that the time-series data of the drive voltage to be subjected to the second-order differentiation is time-series data of the drive voltage after the injection pulse is turned off (in other words, from the drive voltage OFF or the drive current OFF) and a certain period of time elapses. That is, it is desirable that the time-series data of the drive voltage to be subjected to the second-order differentiation be the time-series data of the drive voltage after the drive voltage is turned off and the counter electromotive force is applied.

[Correction of Drive Current]

Next, correction of the drive current calculated by the drive current correction amount calculation unit 213 will be described with reference to FIG. 8.

Figure 8:
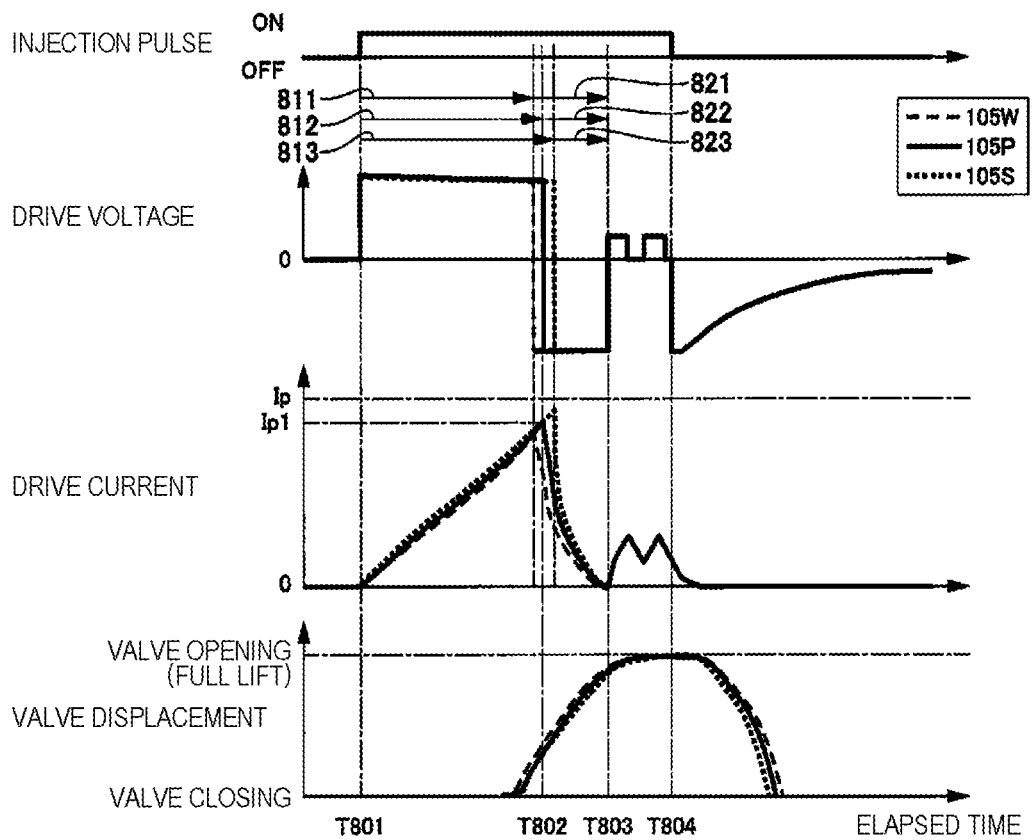
FIG. 8 is a timing chart for describing a driving method of a fuel injection valve when drive current correction according to an embodiment of the present invention is executed.

FIG. 8 is a timing chart illustrating a driving method of the fuel injection valve when the drive current correction is executed. A horizontal axis represents a time, and a vertical axis represents an injection pulse, a drive voltage, a drive current, and a valve displacement.

The drive current correction amount calculation unit 213 calculates a correction amount of the drive current supplied to the fuel injection valve 105 (solenoid 407). Then, by correcting the drive current of each fuel injection valve 105 based on the calculation result of the drive current correction amount calculation unit 213, the injection amount characteristics of each of the fuel injection valves 105 are aligned, and the injection amount variation is reduced. Specifically, the drive current can be corrected by correcting at least one of a peak current value, a peak current energization time, and a reverse voltage application time.

First, a method of driving the fuel injection valve 105 with the drive current to which the correction amount calculated by the drive current correction amount calculation unit 213 is applied will be described by using the solid lines in FIG. 8. The solid lines in the drawing are examples of various waveforms of the (predetermined) fuel injection valve 105 as a reference. The high voltage 210 is applied to the solenoid 407 from a time T801 when the injection pulse is turned on, and a valve opening peak current flows. After the high voltage 210 is applied to the solenoid 407, the movable core 403 is displaced in the valve opening direction by the magnetic attraction force acting on the movable core 403, and performs an idle running operation. Thereafter, the movable core 403 comes into contact with the rear end portion 402*b* of the valve body 402, the valve body 402 starts to be displaced, and fuel is injected from the injection hole 406.

In a normal control without correction, the high voltage 210 is continuously applied until the current reaches the target current Ip as described with reference to FIG. 5, but in the present embodiment, a target current at the time of correction is Ip1 and a peak current energization time is 812. In the example of FIG. 5, since the target current is Ip, the peak current energization time is set to be longer than the time when the peak current reaches the target current Ip, and the application of the high voltage 210 does not complete in the peak current energization time.

After the peak current reaches the target current Ip1, the fuel injection drive units 207a and 207b are turned off for the reverse voltage application time 822 to cut off the peak current (time T802), and the high voltage 210 (reverse voltage) is applied in a negative direction to rapidly decrease the current value. By this reverse voltage application, the current flowing through the solenoid 407 decreases, the magnetic attraction force acting on the movable core 403 decreases, and a kinetic energy of the valve body 402 decreases. As a result, a moving speed of the valve body 402 (the valve opening speed of the fuel injection valve 105) rapidly decreases, and the bouncing operation of the valve body 402 can be suppressed.

In the example of FIG. 5, since the reverse voltage application time is set to 0 and only the fuel injection drive unit 207a is turned off, the high voltage 210 is not applied in the negative direction, and the current gradually decreases until the current reaches the holding current.

Thereafter, when the holding current by application of the low voltage such as the battery voltage 209 is supplied, the magnetic attraction force acting on the movable core 403 increases again, and the valve body 402 is accelerated (time T803). Then, the valve body 402 eventually reaches a full lift position. At a subsequent time (time T804), the injection pulse is turned off. Accordingly, the fuel injection valve 105 is closed.

Next, a method of calculating the correction amount of the drive current will be described by using solid lines, dotted lines, and broken lines in FIG. 8. The solid lines illustrated in FIG. 8 are examples of various waveforms of the (predetermined) fuel injection valve 105 as a reference. In addition, the dotted lines illustrated in FIG. 8 are examples of various waveforms of the fuel injection valve having a relatively strong spring load of the set spring 408 with respect to the reference fuel injection valve 105, and the broken lines are examples of various waveforms of the fuel injection valve having a relatively weak spring load of the set spring 408 with respect to the reference fuel injection valve 105. In the following description, the peak current energization time will be described as an example of correction related to the peak current, but the correction of the peak current value is also similar.

The peak current energization time and the reverse voltage application time are determined based on the valve closing time obtained by indirectly detecting the variation of the fuel injection valve 105. The peak current energization time is set to be shorter than the time during which the movable core 403 reaches (abuts) the fixed core 404 in order to prevent the bouncing operation due to the excessive valve opening force.

Here, a reference (predetermined) fuel injection valve is defined as a fuel injection valve 105P (corresponding to the solid line). In addition, a fuel injection valve having a relatively stronger spring load of the set spring 408 than that of the fuel injection valve 105P is defined as a fuel injection valve 105S (corresponding to the dotted line), and a fuel injection valve having a relatively weaker spring load of the set spring 408 than that of the fuel injection valve 105P is defined as a fuel injection valve 105W (corresponding to the broken line).

The fuel injection valve 105S has a longer time to the completion of valve opening and a shorter time to the completion of valve closing than the fuel injection valve 105P. The peak current energization time 813 of the fuel injection valve 105S is longer than the peak current energization time 812 of the fuel injection valve 105P. That is, the timing of cutting off the peak current of the fuel injection valve 105S is delayed from the timing of cutting off the peak current of the fuel injection valve 105P, and the reverse voltage application time 823 is made shorter than that of the fuel injection valve 105P.

As a result, the value of the peak current flowing through the solenoid 407 of the fuel injection valve 105S becomes larger than the value of the peak current flowing through the solenoid 407 of the fuel injection valve 105P. As a result, the magnetic attraction force acting on the movable core 403 of the fuel injection valve 105S becomes larger than the magnetic attraction force acting on the movable core 403 of the fuel injection valve 105P. Therefore, the valve behavior (injection amount characteristic) when the fuel injection valve 105S is opened can be brought close to the valve behavior when the fuel injection valve 105P is opened.

The fuel injection valve 105W has a shorter time to the completion of valve opening, and a longer time to the completion of valve closing than the fuel injection valve 105P. The peak current energization time 811 of the fuel injection valve 105W is shorter than the peak current energization time 812 of the fuel injection valve 105P. That is, the timing to cut off the drive voltage of the fuel injection valve 105W is made earlier than the timing to cut off the peak current of the fuel injection valve 105P, and the reverse voltage application time is made longer than that of the fuel injection valve 105P.

As a result, the value of the peak current flowing through the solenoid 407 of the fuel injection valve 105W becomes smaller than the value of the peak current flowing through the solenoid 407 of the fuel injection valve 105P. As a result, the magnetic attraction force acting on the movable core 403 of the fuel injection valve 105W becomes smaller than the magnetic attraction force acting on the movable core 403 of the fuel injection valve 105P. Therefore, the valve behavior (injection amount characteristic) when the fuel injection valve 105W is opened can be brought close to the valve behavior when the fuel injection valve 105P is opened.

In this manner, by respectively setting the peak current energization time and the reverse voltage application time to be longer or shorter than the peak current energization time 812 of the fuel injection valve 105P as a reference, it is possible to cause the magnetic attraction force according to the variations of the fuel injection valves 105P, 105S, and 105W to act to align the valve behaviors at the time of valve opening.

The valve closing time of each of the fuel injection valves 105P, 105S, and 105W may be measured in advance, and the peak current energization time or the reverse voltage application time may be calculated from the relationship between the valve closing completion time and the peak current energization time or the reverse voltage application time calculated in advance based on the valve closing completion time. Accordingly, by measuring the valve closing completion time in a plurality of operation states and recording the valve closing completion time in the memory 142 of the ECU 109, the peak current energization time can be corrected in a wide range of operation states.

In the above example, the peak current energization time has been used for description, but the peak current value may be used instead of the peak current energization time.

That is, the peak current value is increased for the fuel injection valve 105S having a short valve closing completion time, and the current value is decreased for the fuel injection valve 105W having a long valve closing time.

In addition, by measuring the valve closing completion time at the time of operation, a state of time degradation of the fuel injection valve 105 can be monitored. Therefore, even if the operation of the fuel injection valve 105 changes due to time degradation, the peak current value, the peak current energization time, or the reverse voltage application time can be corrected according to the time degradation, and the injection amount variation can be reduced.

Figure 9:
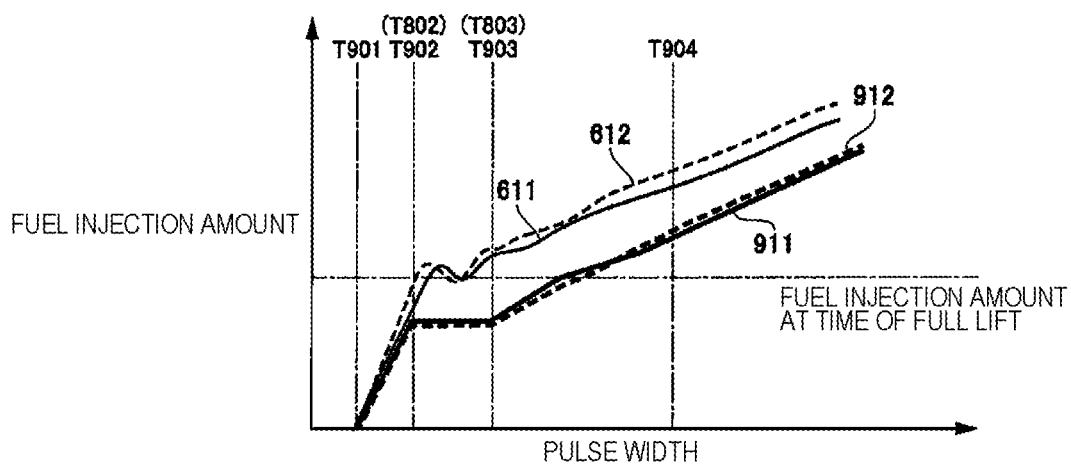
FIG. 9 is a diagram illustrating a relationship between an injection pulse width of a fuel injection valve when drive current correction according to an embodiment of the present invention is executed and a fuel injection amount.

FIG. 9 is a diagram illustrating injection amount characteristic when the drive current correction described with reference to FIG. 8 is performed, and each injection amount characteristic after the drive current correction is executed is indicated by a thick line. A horizontal axis represents the injection pulse width, and a vertical axis represents the fuel injection amount per time.

Injection amount characteristics 611 and 612 indicated by thin lines in FIG. 9 are the injection amount characteristics 611 and 612 illustrated in FIG. 6 (injection amount characteristic when the fuel injection valve driving method illustrated in FIG. 5 is executed). Injection amount characteristics 611 and 911 of the fuel injection valve 105P as a reference are represented by solid lines, and injection amount characteristics 612 and 912 of the fuel injection valve 105W having a relatively weak spring load of the set spring 408 with respect to the fuel injection valve 105P are represented by broken lines.

As illustrated in FIG. 9, the injection amount characteristic 911 increases from a time T901 when the fuel injection valve 105P starts the valve opening operation to a time T902 (corresponding to the time T802 in FIG. 8) when the peak current is reached. Then, at the time T902, the reverse voltage is applied to cut off the peak current. During the reverse voltage application time (from the time T902 to a time T903), the fuel injection drive units 207a and 207b are turned off, and the injection amount does not change no matter where the injection pulse is turned off. The time T903 corresponds to the time T803 in FIG. 8. Therefore, the injection amount characteristic 911 becomes flat until the time T903, which is the timing when the reverse voltage application time ends, and thereafter, the injection amount characteristic 911 starts to increase again by starting the application of the low voltage. A time T904 corresponds to the time T602 at which the bouncing operation converges.

Similarly, for the injection amount characteristic 912 of the fuel injection valve 105W, the injection amount characteristic can be brought close to the injection amount characteristic 911 by correcting the drive current and matching the behavior of the valve body 402 at the time of valve opening with the fuel injection valve 105P.

In addition, since the drive current correction is controlled to optimize the valve opening force according to the valve closing completion time of each fuel injection valve, the injection amount characteristic during the bouncing operation can be gradually and linearly increased with respect to the injection amount characteristics 611 and 612 before the current correction, and the injection amount variation can be reduced.

However, when the injection pulse is turned off after the valve body 402 moves to the full lift position, the variation in the valve closing completion time becomes the injection amount variation, and thus, similarly to the relationship between the injection amount characteristics 611 and 612, the injection amount characteristic 911 and the injection amount characteristic 912 after the current correction also generate the injection amount variations.

[Correction of Injection Pulse Width]

Next, correction of the injection pulse width calculated by the injection pulse width correction amount calculation unit 214 will be described.

As described with reference to FIG. 6, since the spring load of the set spring 408 of each fuel injection valve varies, the injection amount also varies. That is, since the injection pulse width with respect to the required injection amount calculated by the engine state detection unit 203 is calculated by using the injection amount characteristic of the fuel injection valve 105P as a reference such as a variation central product measured in advance, it is necessary to change the injection pulse width for each fuel injection valve in order to reduce the injection amount variation of each fuel injection valve.

The correction of the injection pulse width will be described by using the injection amount characteristic of FIG. 10.

Figure 10:
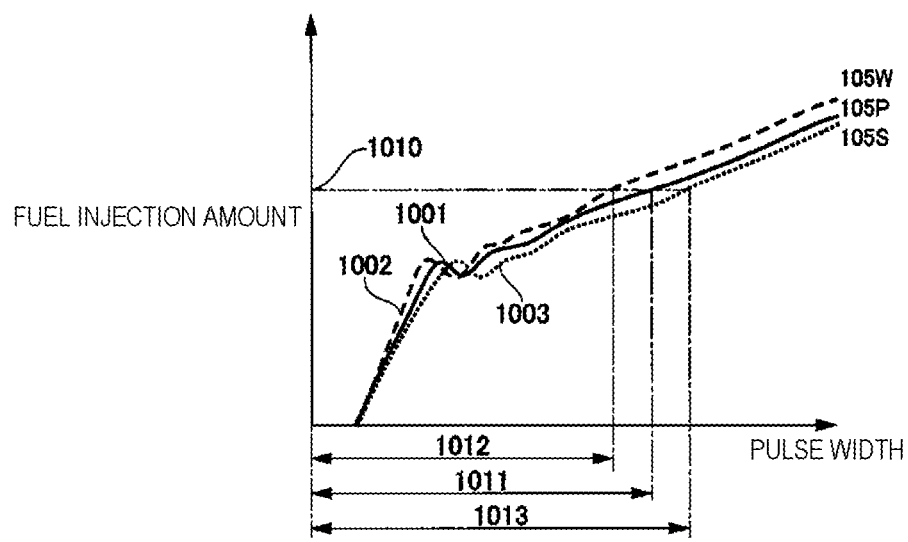
FIG. 10 is a diagram illustrating a relationship between an injection amount characteristic and an injection pulse width correction amount of each fuel injection valve.

FIG. 10 is a diagram illustrating a relationship between the injection pulse width and the fuel injection amount, where a horizontal axis represents an injection pulse width and a vertical axis represents a fuel injection amount for each injection pulse width. In the drawing, a reference numeral 1001 denotes an injection amount characteristic (solid line) of the fuel injection valve 105P, a reference numeral 1002 denotes an injection amount characteristic (broken line) of the fuel injection valve 105W, and a reference numeral 1003 denotes an injection amount characteristic (dotted line) of the fuel injection valve 105S.

For example, in a case where fuel is injected with a certain required injection amount, when the fuel injection valve 105W having a small spring load of the set spring 408 is driven with the injection pulse width calculated based on the injection amount characteristic 1001, the injection amount increases. On the other hand, when the fuel injection valve 105S having a large spring load of the set spring 408 is driven with the injection pulse width calculated based on the injection amount characteristic 1001, the injection amount decreases.

That is, in order to match an injection amount 1010 with respect to the required injection amount in each fuel injection valve, it is necessary to shorten the injection pulse width (injection pulse width 1012) with respect to an injection pulse width 1011 of a reference product (for example, a variation central product) for the fuel injection valve 105W having a weak spring load of the set spring 408. In addition, the fuel injection valve 105S having a strong spring load of the set spring 408 needs to have an injection pulse width (injection pulse width 1013) longer than the injection pulse width 1011 of the reference product.

Therefore, in the present embodiment, the relationship of the injection pulse width correction amount with respect to the valve closing completion time is measured in advance and stored in the memory 142, and the injection pulse width is corrected by calculating the injection pulse width correction amount with respect to the measured valve closing completion time.

[Relationship between Injection Pulse Width Correction Amount and Valve Closing Completion Time]

Figure 11:
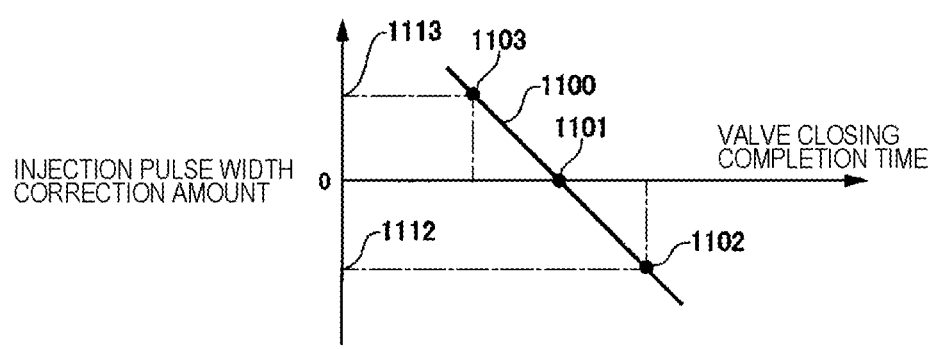
FIG. 11 is a diagram for describing a relationship between a valve closing completion time and an injection pulse width correction amount used when executing injection pulse width correction according to an embodiment of the present invention.

FIG. 11 illustrates a relationship between the injection pulse width correction amount and the valve closing completion time. The valve closing completion times are measured with a plurality of fuel injection valves 105 in advance by experiment, and the injection pulse width correction amount is calculated from the injection amount characteristics of the fuel injection valves 105 in which the valve closing completion times are measured, thereby a relational expression 1100 between the valve closing completion time and the injection pulse width correction amount can be calculated.

For example, when the spring load of the set spring 408 is large, the valve closing completion time is shortened, and thus, in the case of the fuel injection valve 105S, it is necessary to increase the injection pulse width in order to satisfy the required injection amount. Therefore, a correction value 1113 of the injection pulse width for a valve closing completion time 1103 shorter than a reference valve closing completion time 1101 is a positive value. Conversely, when the spring load of the set spring 408 is small, the valve closing completion time becomes long. Therefore, in the case of the fuel injection valve 105W, it is necessary to shorten the injection pulse width in order to satisfy the required injection amount. Therefore, a correction value 1112 of the injection pulse width for a valve closing completion time 1102 longer than the reference valve closing completion time 1101 is a negative value.

The relational expression 1100 can be calculated by approximating the valve closing completion times of the plurality of fuel injection valves 105 and the data of the injection pulse width correction amount by a least squares method or the like. Although an approximate straight line for the predetermined fuel injection amount is illustrated in FIG. 11, the injection pulse width that matches the injection amount characteristic can be calculated by calculating the approximate straight line with a plurality of fuel injection amounts. In addition, since the injection amount characteristic changes not only by a solid difference of the fuel injection valve but also by the fuel pressure, the injection pulse width correction amount with respect to the reference injection pulse width may be calculated for each specific fuel pressure.

Since the relational expression 1100 calculated above is a fuel pressure representative point, the injection pulse width correction amount with respect to the actual fuel pressure (for example, the fuel pressure measured by the fuel pressure sensor) may be calculated by calculating the correction amount of the fuel pressure representative point larger than the actual fuel pressure and the correction amount of the fuel pressure representative point smaller than the actual fuel pressure, and performing linear interpolation between the two points. The same applies to the injection amount, and the injection amount may be calculated by linear interpolation between two points.

In this manner, the correction amount of the injection pulse width is calculated from the relational expression 1100 based on the valve closing completion time calculated by the method illustrated in FIG. 7, and the correction amount is added to the injection pulse width serving as a reference calculated with respect to the required injection amount, thereby the injection pulse width corresponding to the individual difference of the fuel injection valve 105 can be calculated.

[Selection of Correction Method]

Next, an operation of the correction method selection unit 212 will be described.

The correction method selection unit 212 selects whether or not to apply each of the correction amounts calculated by the drive current correction amount calculation unit 213 and the injection pulse width correction amount calculation unit 214 to the drive current and/or the injection pulse width.

Figure 12:
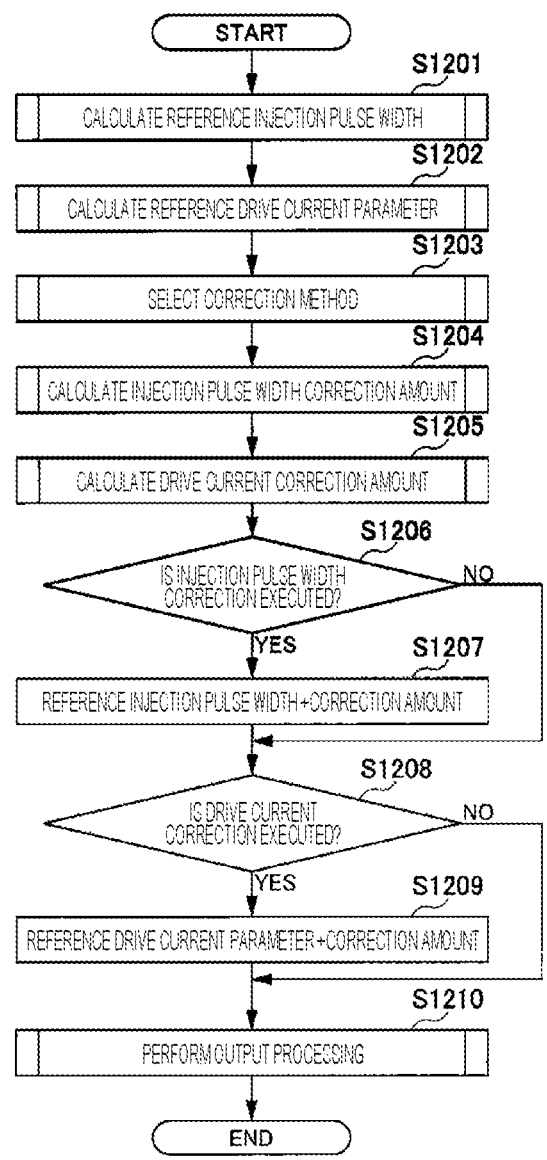
FIG. 12 is a flowchart illustrating a procedure example of drive correction processing according to an embodiment of the present invention.

FIG. 12 is a flowchart illustrating a procedure example of drive correction processing by the fuel injection control device 127. First, the fuel injection pulse signal calculation unit 201 calculates the injection pulse width based on the engine state transmitted from the engine state detection unit 203 (S1201). The injection pulse width calculated here is an injection pulse width common to all of the cylinders. The injection pulse width is calculated by using the injection amount characteristic measured in advance from the required injection amount. Basically, since the injection pulse width is calculated by using the injection amount characteristic with respect to the fuel injection valve 105 serving as the reference (or a variation central product), the injection pulse width is also the pulse width of the fuel injection valve 105 serving as a reference.

Next, the fuel injection drive waveform command unit 202 determines a drive current parameter (S1202). The drive current parameter calculated here is a parameter common to all of the cylinders, and a value is determined in consideration of an operation limit of the fuel injection valve 105. In order to optimize the parameter, the drive current parameter is switched according to a fuel pressure. For example, in a case where the switching is performed in four stages, a case where the fuel pressure becomes higher than a normally used range due to a failure of the device or the like is defined as an abnormal fuel-pressure drive current waveform, and it is divided into three stages within the normally used fuel pressure range. Then, a high-fuel-pressure drive current waveform, a medium-fuel-pressure drive current waveform, and a low-fuel-pressure drive current waveform are set in a descending order of the fuel pressure. Elements that determine the drive current waveforms are, for example, a peak current, a peak current energization time, a holding current, or the like.

Next, the correction method selection unit 212 selects whether or not the drive correction is necessary and which correction method of the injection pulse width correction or the drive current correction is executed if the drive correction is necessary (S1203). The correction method selection unit 212 determines necessity of the drive correction and the drive method based on various input signals input to the engine state detection unit 203 of the fuel injection control device 127.

For example, if the injection amount variation of each fuel injection valve is within a predetermined range, it is determined that the drive correction is not necessary, and otherwise, it is determined that the drive correction is necessary. Although details of the selection of the correction method will be described later, as an example, drive current control (correction) is executed when a biasing force of the fuel injection valve in the valve closing direction is weak (when the valve body bouncing is large), and injection pulse width control (correction) is executed when the biasing force of the fuel injection valve in the valve closing direction is strong (when the valve body bouncing is small).

Next, the injection pulse width correction amount calculation unit 214 calculates the correction amount of the injection pulse width (S1204). As described above, the injection pulse width correction amount calculation unit 214 calculates the injection pulse width correction amount based on the valve closing completion time of each fuel injection valve. When the injection pulse width correction is not selected in step S1203, the calculation of the correction amount in this step may be omitted.

Next, the drive current correction amount calculation unit 213 calculates the correction amount of the drive current (S1205). As described above, the drive current correction amount calculation unit 213 calculates the correction amount of the drive current based on the valve closing completion time of each fuel injection valve. When the drive current correction is not selected in step S1203, the calculation of the correction amount in this step may be omitted.

Next, the injection pulse width correction amount calculation unit 214 determines whether or not to execute the injection pulse width correction (S1206). In this determination, the selection result of the correction method in step S1203 is used. When it is determined in step S1206 that the injection pulse width correction is executed (YES in S1206), next, the fuel injection pulse signal calculation unit 201 adds the correction amount of the injection pulse width calculated by the injection pulse width correction amount calculation unit 214 to the injection pulse width serving as a reference, and corrects the injection pulse width of each fuel injection valve (S1207). When it is determined that the injection pulse width correction in step S1207 is ended or the injection pulse width correction is not executed (NO in S1206), the process proceeds to step S1208. In the present embodiment, when NO is determined in step S1206, the injection pulse width correction is not executed, but the correction amount of the injection pulse width may be set to 0 and the process may proceed to step S1207.

Next, the drive current correction amount calculation unit 213 determines whether or not to execute the drive current correction (S1208). In this determination, the selection result of the correction method in step S1203 is used. When it is determined in step S1208 that the drive current correction is executed (YES in S1208), next, the fuel injection drive waveform command unit 202 adds the correction amount of the drive current calculated by the drive current correction amount calculation unit 213 to the drive current serving as a reference to correct the drive current of each fuel injection valve (S1209). When the drive current correction in step S1209 is ended or when it is determined that the drive current correction is not executed in step S1208 (NO in S1208), the process proceeds to step S1210. In the present embodiment, the drive current correction is not executed when NO is determined in step S1208, but the correction amount of the drive current may be set to 0 and the process may proceed to step S1209.

Then, in step S1210, the fuel injection pulse signal calculation unit 201 and/or the fuel injection drive waveform command unit 202 performs output processing. In the output processing, as described above, the period (injection pulse width) for energizing each fuel injection valve and the current value for energizing are transmitted to the drive IC 208.

As described above, the fuel injection control device according to the present embodiment is a fuel injection control device (fuel injection control device 127) that controls a plurality of fuel injection valves (fuel injection valves 105) including a coil (solenoid 407) for energization. The fuel injection control device of the present embodiment includes a valve body operation time detection unit (valve body operation time detection unit 211) that detects a valve closing completion time (valve closing time 701) from an end of energization of the fuel injection valve to an end of valve closing of a valve body (valve body 402) of the fuel injection valve, a drive current correction unit (drive current correction amount calculation unit 213) that corrects a drive current parameter of the fuel injection valve based on the valve closing completion time, an injection pulse width correction unit (injection pulse width correction amount calculation unit 214) that corrects the energization time of the fuel injection valve based on the valve closing completion time, and a correction method selection unit that selects at least one of the drive current correction unit and the injection pulse width correction unit based on a state of the engine (system including the internal combustion engine 101) and executes correction.

In the fuel injection control device (fuel injection control device 127) of the present embodiment, the drive current correction unit (drive current correction amount calculation unit 213) and the injection pulse width correction unit (injection pulse width correction amount calculation unit 214) perform each correction for each of the plurality of fuel injection valves (fuel injection valves 105).

According to the fuel injection control device having the above configuration, the injection amount variation can be reduced by appropriately selecting the driving method of the plurality of fuel injection valves according to the engine state. For example, an injection amount accuracy of each fuel injection valve can be improved regardless of whether the valve body of the fuel injection valve is in the half lift state or the full lift state, and regardless of the engine speed or the engine load. Further, by improving the injection amount accuracy of each fuel injection valve, unintended deterioration of exhaust emission can be prevented.

In the fuel injection control device (fuel injection control device 127) according to the present embodiment, the drive current correction unit (drive current correction amount calculation unit 213) changes at least one of the peak current, the peak current energization time, and the reverse voltage application time with respect to the drive current parameter common to the plurality of fuel injection valves based on the valve closing completion time (valve closing time 701) of the fuel injection valve (fuel injection valve 105), and performs processing of setting the changed drive current parameter as the drive current parameter of the fuel injection valve.

In addition, in the fuel injection control device (fuel injection control device 127) according to the present embodiment, the injection pulse width correction unit (injection pulse width correction amount calculation unit 214) changes the energization time (for example, injection pulse width) common to the plurality of fuel injection valves based on the relationship between the valve closing completion time (valve closing time 701) of the fuel injection valve (fuel injection valve 105) and the injection amount, and performs processing of setting the changed energization time as the energization time of the fuel injection valve.

Modification

Next, a method for selecting drive correction for each type of correction amount will be described.

[Selection by Fuel Pressure]

First, a method for selecting drive correction based on the fuel pressure will be described. When the fuel pressure increases, a biasing force (pressing force) of the fuel injection valve in the valve closing direction increases. That is, as the fuel pressure increases, a valve opening force (magnetic attraction force against the biasing force) is required in a case where the fuel pressure is low, and when the peak current necessary for valve opening is reduced, an operation limit fuel pressure of the fuel injection valve decreases. Therefore, when the fuel pressure is high, it is desirable to perform correction without reducing the valve opening force. In addition, when the biasing force of the fuel injection valve increases, a valve body speed at the time of valve opening decreases, so that the bouncing operation of the valve body after reaching the full lift decreases, and the injection amount variation after reaching the full lift decreases as compared with a case of low fuel pressure.

Therefore, the correction method is selected according to the fuel pressure. The correction method selection unit 212 selects the injection pulse width correction when the fuel pressure is a predetermined value or more, and selects and executes at least one of the drive current correction and the injection pulse width correction when the fuel pressure is less than the predetermined value.

The predetermined value is set in advance by experiment. For example, the injection amount characteristics are measured at a plurality of fuel pressures, and a fuel pressure at which the injection amount variation due to the bouncing operation of the valve body 402 after reaching the full lift is equal to or less than a required variation value is set as a predetermined fuel pressure value. The predetermined fuel pressure value can also be obtained from an operation limit when the drive current control is performed. For example, when the drive current control is performed at a certain fuel pressure value, the fuel pressure may be set so that a valve opening failure does not occur within a maximum change range from the fuel pressure.

[Selection by Drive Current Waveform]

In addition, the correction method may be selected according to the drive current waveform. Generally, when the pressing force of the valve body increases, it is necessary to increase the valve opening force, so that the current value at the time of driving is increased. That is, when the current value of the peak current at the time of driving is large, the pressing force becomes large, and the bouncing operation at the time of valve opening becomes small. Therefore, the correction method selection unit 212 executes the injection pulse width correction when the current value of the peak current is equal to or greater than a predetermined value, and selects and executes at least one of the drive current correction and the injection pulse width correction when the current value of the peak current is less than the predetermined value.

[Selection by Valve Closing Time]

Next, a method for selecting the drive correction based on the valve closing time will be described. Since the valve closing time (valve closing completion time) is a time from when the injection pulse is turned off until the valve body 402 reaches the valve seat 405, the biasing force applied to the valve body 402 is indirectly expressed. The biasing force includes not only the fuel pressure but also a spring force and a frictional force of a sliding portion such as the movable core 403.

As described above, the bouncing operation of the valve body 402 after reaching the full lift is different according to the biasing force applied to the valve body 402, and the required valve opening force is also different. Therefore, the valve closing time is measured in advance for each fuel pressure, the relationship with the injection amount variation and the operation limit is obtained, and a predetermined valve closing time is set. The correction method selection unit 212 performs the injection pulse width correction when the valve closing time is equal to or longer than a predetermined valve closing time, and selects and executes at least one of the drive current correction and the injection pulse width correction when the valve closing time is less than the predetermined valve closing time.

[Selection based on Magnitude of Inflection Point (Second-Order Differential Value)]

Similarly, a magnitude of an inflection point at the time of detecting the valve closing may be used. An inflection point 702 represents a change amount of a voltage after the injection pulse is turned off. That is, the magnitude of the inflection point 702 is an acceleration change when the movable core 403 and the valve body 402 are seated. For example, as the fuel pressure increases, the biasing force of the valve body 402 also increases, so that the speed at the time of valve closing increases, and the acceleration change amount at the time of seating increases, and therefore a second-order differential value of the inflection point 702 increases. Therefore, it is possible to select a correction method according to the magnitude of the second-order differential value of the inflection point 702.

Specifically, the correction method selection unit 212 performs the injection pulse width correction when the second-order differential value is equal to or greater than a predetermined value, and selects and executes at least one of the drive current correction and the injection pulse width correction when the second-order differential value is less than the predetermined value. As described above, by selecting the correction method by using the valve closing time and the second-order differential value, it is possible to select an optimum correction method for each fuel injection valve.

[Selection by Required Injection Amount]

Next, a method of selecting a correction method according to a required fuel injection amount will be described. As illustrated in FIG. 9, when the fuel injection valve 105 is driven with a normal drive current parameter, the injection amount characteristic before reaching a full lift has a steep inclination, and thus, the injection amount change with respect to the injection pulse width is large, and a controllability is poor. On the other hand, when the drive current correction is executed, the valve opening speed of the valve body 402 is reduced, the inclination of the injection amount characteristic is made gentle, and a linearity can be secured. In addition, the bouncing operation immediately after reaching the full lift when the fuel injection valve 105 is driven with the normal drive current parameter is relatively large, and a reproducibility is poor, so that it cannot be sufficiently corrected by the injection pulse width control.

Therefore, the correction method selection unit 212 executes the injection pulse width correction when the required injection amount is a predetermined value or more, and selects and executes at least one of the drive current correction and the injection pulse width correction when the required injection amount is less than the predetermined value. As a result, the variation for each of the fuel injection valves can be reduced, and the controllability can be further improved. In the injection amount characteristic when driven by normal control, the predetermined value may be an injection amount that is stable in the full lift state after the bouncing operation is completed, or an injection amount that the fuel injection amount starts to increase after the initial bouncing operation is completed.

[Selection by Required Injection Pulse Width]

In addition, the correction method can be selected according to the required injection pulse width instead of the required injection amount. The relationship between the injection amount of the fuel injection valve 105 and the injection pulse width can be calculated in advance from the injection amount characteristic. The correction method selection unit 212 executes the injection pulse width correction when the required injection pulse width is a predetermined value or more, and selects and executes at least one of the drive current correction and the injection pulse width correction when the injection pulse width is less than the predetermined value. The predetermined value can be considered similarly to the case of switching with the required injection amount. That is, in the injection amount characteristic when the fuel injection valve 105 is driven by the normal control, the injection pulse width after the correction may be set to an injection pulse width that is stable in the full lift state after the bouncing operation is completed, or an injection pulse width that the fuel injection amount starts to increase after an initial bouncing operation is completed.

[Selection by Engine Speed]

Next, a method of switching a drive correction according to an engine speed will be described. When the drive current correction is executed, the injection pulse width for realizing the same injection amount becomes longer than that in the normal control. This is because it takes time for the valve body 402 to reach the full lift since the valve opening force is reduced to slow the valve body operation at the time of valve opening.

When the drive current correction is executed in a high rotation range of the engine, the injection pulse width becomes longer than that in the normal control in order to perform the injection with the required injection amount, and there is a possibility that the air and fuel are not sufficiently mixed in the cylinder to cause a decrease in combustion stability and an increase in exhaust temperature. Therefore, the correction method selection unit 212 executes the injection pulse width correction when the engine speed is equal to or greater than a predetermined value, and selects and executes at least one of the drive current correction and the injection pulse width correction when the engine speed is less than the predetermined value. Here, as the predetermined value, it is preferable that the engine speed causing the deterioration of combustion is measured in advance by an experiment when the drive current control is executed, and the engine speed at this time is set.

[Parallel Execution of Drive Current Correction and Injection Pulse Width Correction]

In the embodiment described above, a method for selecting a drive current correction and an injection pulse width correction has been described, but the present invention is not limited to the example described above. For example, when the correction method selection unit 212 determines that the relationship between a value representing a state of the engine and a set value satisfies a predetermined condition and executes the drive current correction, the injection pulse width correction is also executed, so that the injection amount variation can be further reduced. As illustrated in the injection amount characteristics 911 and 912 of FIG. 9, even if the drive current correction is executed, a slight offset occurs in the injection amount characteristic of each fuel injection valve 105. The correction amount of the injection pulse width is calculated based on the offset amount, and the injection pulse width is changed for each fuel injection valve, so that the injection pulse width matching the required injection amount can be calculated.

[When Only Injection Pulse Width Correction is Executed]

In the embodiment described above, when the relationship between the value representing the state of the engine and the set value satisfies a predetermined condition, the correction method selection unit 212 can execute only the injection pulse width correction without executing the drive current correction. As described with reference to FIG. 10, a linearity of the injection amount characteristic can be secured by the injection pulse width correction, and a controllability of the fuel injection valve is improved.

The embodiment of the fuel injection control device of the present invention has been described above including the operational effects thereof. However, the fuel injection control device of the present invention is not limited to the above-described embodiment, and it goes without saying that various other application examples and modifications can be taken without departing from the gist of the invention described in the claims.

For example, the above-described embodiments describe the configuration of the fuel injection control device in detail and specifically in order to describe the present invention in an easy-to-understand manner, and are not necessarily limited to those including all the components described above. In addition, a part of the configuration of one embodiment can be replaced with a component of another embodiment. In addition, components of other embodiments can be added to the configuration of one embodiment. In addition, it is also possible to add, replace, or delete other components for a part of the configuration of each embodiment.

For example, in the above-described embodiment, an example has been described in which a voltage cutoff start timing and a voltage cutoff end timing in the full lift control are changed in the drive current control. However, changing the voltage cutoff start timing and the voltage cutoff end timing according to the present invention to reduce the injection amount variation can also be applied in the half lift control.

Furthermore, in the flowchart illustrated in FIG. 12, a plurality of processing may be executed in parallel or the processing order may be changed within a range not affecting the processing result. For example, correction method selection processing may be executed after the processing of calculating the correction amount of the injection pulse width and the processing of calculating the correction amount of the drive current are executed. Thereafter, the correction method selection unit 212 outputs at least one of the correction amount of the injection pulse width and the correction amount of the drive current to the corresponding fuel injection pulse signal calculation unit 201 or fuel injection drive waveform command unit 202. In this case, a block configuration of the fuel injection control device 127 illustrated in FIG. 2 is changed so as to execute the above procedure.

In addition, some or all of the above-described configurations, functions, processing units, and the like may be realized by hardware, for example, by designing with an integrated circuit. A field programmable gate array (FPGA), an application specific integrated circuit (ASIC), or the like may be used as the hardware.

REFERENCE SIGNS LIST 101 internal combustion engine
102 piston
105 fuel injection valve
109 ECU
123 fuel tank
124 low-pressure fuel pump
125 high-pressure fuel pump
126 fuel pressure sensor
127 fuel injection control device
129 high-pressure fuel pipe
201 fuel injection pulse signal calculation unit
202 fuel injection drive waveform command unit
203 engine state detection unit
204 fuse
205 relay
206 high voltage generation unit
207a, 207b fuel injection drive unit
208 drive IC
209 battery voltage
210 high voltage (power supply voltage)

211 valve body operation time detection unit
212 correction method selection unit
213 drive current correction amount calculation unit
214 injection pulse width correction amount calculation unit
301, 302, 308, 309 diode
303 high-voltage side switching element
304 low-voltage side switching element
305 switching element
306 shunt resistor
401 housing
402 valve body
402a distal end portion
402b rear end portion
403 movable core
403a through-hole
404 fixed core
405 valve seat
406 injection hole
407 solenoid
408 set spring
409 zero spring
701 valve closing time (valve closing completion time)

The invention claimed is:

1. A fuel injection control device that controls a plurality of fuel injection valves including a coil for energization, the device comprising:
a valve body operation time detection unit that, for at least one of the fuel injection valves, detects a valve closing completion time from an end of energization of the fuel injection valve to completion of valve closing of a valve body of the fuel injection valve;
a drive current correction unit that, for the at least one fuel injection valve, corrects a drive current parameter of the fuel injection valve based on the valve closing completion time;
an injection pulse width correction unit that, for the at least one fuel injection valve, corrects an energization time of the fuel injection valve based on the valve closing completion time; and
a correction method selection unit that determines a state of an engine and selects at least one of the drive current correction unit and the injection pulse width correction unit to execute correction based on the determined state of the engine.

2. The fuel injection control device according to claim 1, wherein the drive current correction unit changes at least one of a peak current, a peak current energization time, and a reverse voltage application time for a drive current parameter common to the plurality of fuel injection valves based on the valve closing completion time of the fuel injection valve, and uses the changed drive current parameter as the drive current parameter of the at least one fuel injection valve.

3. The fuel injection control device according to claim 1, wherein the injection pulse width correction unit changes an energization time common to the plurality of fuel injection valves based on a relationship between the valve closing completion time and an injection amount of the fuel injection valve, and uses the changed energization time as the energization time of the at least one fuel injection valve.

4. The fuel injection control device according to claim 1, wherein for the at least one fuel injection valve, the determined state of the engine comprises a pressure of fuel supplied to the fuel injection valve, and the correction method selection unit selects the injection pulse width correction unit when the pressure of fuel supplied to the fuel injection valve is equal to or greater than a set value, and selects at least one of the drive current correction unit and the injection pulse width correction unit when the pressure of the fuel is smaller than the set value.

5. The fuel injection control device according to claim 1, wherein for the at least one fuel injection valve, the determined state of the engine comprises a valve closing completion time, and the correction method selection unit selects the injection pulse width correction unit when the valve closing completion time is equal to or less than a set value, and selects at least one of the drive current correction unit and the injection pulse width correction unit when the valve closing completion time is longer than the set value.

6. The fuel injection control device according to claim 1, wherein for the at least one fuel injection valve, the determined state of the engine comprises a voltage between terminals of the coil of the fuel injection valve at a valve closing completion timing, and the correction method selection unit selects the injection pulse width correction unit when a second-order differential value with respect to the voltage between terminals of the coil of the fuel injection valve at a valve closing completion timing is equal to or greater than a set value, and selects at least one of the drive current correction unit and the injection pulse width correction unit when the second-order differential value is smaller than the set value.

7. The fuel injection control device according to claim 1, wherein for the at least one fuel injection valve, the determined state of the engine comprises a peak current value of a drive current of the fuel injection valve or a peak current energization time, and the correction method selection unit selects the injection pulse width correction unit when the peak current value of a drive current of the fuel injection valve or a peak current energization time is equal to or greater than a set value, and selects at least one of the drive current correction unit and the injection pulse width correction unit when the peak current value or the peak current energization time is smaller than the set value.

8. The fuel injection control device according to claim 1, wherein for the at least one fuel injection valve, the determined state of the engine comprises an engine speed, and the correction method selection unit selects the injection pulse width correction unit when the engine speed is equal to or greater than a set value, and selects at least one of the drive current correction unit and the injection pulse width correction unit when the engine speed is smaller than the set value.

9. The fuel injection control device according to claim 1, wherein for the at least on fuel injection valve, the determined state of the engine comprises a required injection amount, and the correction method selection unit selects the injection pulse width correction unit when the required injection amount is equal to or greater than a set value, and selects at least one of the drive current correction unit and the injection pulse width correction unit when the required injection amount is smaller than the set value.

10. The fuel injection control device according to claim 1, wherein for the at least on fuel injection valve, the determined state of the engine comprises a required injection pulse width, and the correction method selection unit selects the injection pulse width correction unit when the required injection pulse width is equal to or greater than a set value, and selects at least one of the drive current correction unit and the injection pulse width correction unit when the required injection pulse width is smaller than the set value.

11. The fuel injection control device according to claim 1, wherein the correction method selection unit executes correction by the injection pulse width correction unit together with correction by the drive current correction unit when a relationship between a value representing the state of the engine and a set value satisfies a predetermined condition.

12. The fuel injection control device according to claim 1, wherein the correction method selection unit executes correction by the injection pulse width correction unit without executing correction by the drive current correction unit when a relationship between a value representing the state of the engine and a set value satisfies a predetermined condition.

13. The fuel injection control device according to claim 1, wherein the drive current correction unit and the injection pulse width correction unit perform each correction for each of the plurality of fuel injection valves.

14. The fuel injection control device according to claim 1, wherein the drive current parameter that the drive current correction unit corrects is different from the energization time of the fuel injection valve, and wherein the drive current correction unit corrects a drive current parameter without changing or further changing the energization time of the fuel injection valve.

15. The fuel injection control device according to claim 1, wherein the correction method selection unit selects the drive current correction unit to correct the drive current parameter of the fuel injection valve when a biasing force of the fuel injection valve in a valve closing direction is weak, and the correction method selection unit selects the injection pulse width correction unit to correct an energization time of the fuel injection valve when the biasing force of the fuel injection valve in the valve closing direction is strong.

16. The fuel injection control device according to claim 1, wherein for the at least one fuel injection valve, the determined state of the engine comprises a pressure of fuel supplied to the fuel injection valve, and the correction method selection unit selects the injection pulse width correction unit when the pressure of fuel supplied to the fuel injection valve is equal to or greater than a set value, and is able to select the drive current correction unit when the pressure of the fuel is smaller than the set value.

17. The fuel injection control device according to claim 1, wherein for the at least one fuel injection valve, the determined state of the engine comprises a valve closing completion time, and the correction method selection unit selects the injection pulse width correction unit when the valve closing completion time is equal to or less than a set value, and is able to select the drive current correction unit when the valve closing completion time is longer than the set value.

18. The fuel injection control device according to claim 1, wherein for the at least one fuel injection valve, the determined state of the engine comprises a voltage between terminals of the coil of the fuel injection valve at a valve closing completion timing, and the correction method selection unit selects the injection pulse width correction unit when a second-order differential value with respect to the voltage between terminals of the coil of the fuel injection valve at a valve closing completion timing is equal to or greater than a set value, and is able to select the drive current correction unit when the second-order differential value is smaller than the set value.

19. The fuel injection control device according to claim 1, wherein for the at least one fuel injection valve, the determined state of the engine comprises a peak current value of a drive current of the fuel injection valve or a peak current energization time the correction method selection unit selects the injection pulse width correction unit when the peak current value of a drive current of the fuel injection valve or a peak current energization time is equal to or greater than a set value, and is able to select the drive current correction unit when the peak current value or the peak current energization time is smaller than the set value.

20. The fuel injection control device according to claim 1, wherein for the at least one fuel injection valve, the determined state of the engine comprises an engine speed, and the correction method selection unit selects the injection pulse width correction unit when the engine speed is equal to or greater than a set value, and is able to select the drive current correction unit when the engine speed is smaller than the set value.

* * * * *